United States Patent [19]

Masubuchi

[11] Patent Number: 4,662,718

[45] Date of Patent: May 5, 1987

[54] EXPANSION SYSTEM FOR A LIQUID CRYSTAL DISPLAY

[75] Inventor: Sadao Masubuchi, Tokorozawa, Japan

[73] Assignee: Citizen Watch Co., Ltd., Tokyo, Japan

[21] Appl. No.: 662,688

[22] Filed: Oct. 19, 1984

[30] Foreign Application Priority Data

Oct. 20, 1983 [JP] Japan ................. 58-195270

[51] Int. Cl.⁴ ............................ G06F 3/02
[52] U.S. Cl. ..................... 350/332; 350/333
[58] Field of Search .......... 350/332, 333; 340/800, 340/801, 814, 784, 707, 765

[56] References Cited

U.S. PATENT DOCUMENTS 4,345,248  8/1982  Togashi et al. .............. 350/332

Primary Examiner—Arthur G. Evans
Attorney, Agent, or Firm—Birch, Stewart, Kolasch & Birch

[57] ABSTRACT

An expansion system for a liquid crystal video display device having a plurality of scanning electrodes, a plurality of data electrodes, drivers for respectively driving the scanning electrodes and data electrodes. The scanning electrodes and data electrodes are driven only during an expansion period in a field, and voltage between the scanning electrode and the data electrode is zero during a non-expansion period in the field.

2 Claims, 7 Drawing Figures

EXPANSION SYSTEM FOR A LIQUID CRYSTAL DISPLAY

BACKGROUND OF THE INVENTION

The present invention relates to an expansion system for a liquid crystal video display device of a matrix type, and more particularly to a liquid crystal display system in which a part of a video signal is displayed on a matrix display panel on an increased scale.

FIG. 1 is a block diagram showing a conventional liquid crystal video display device. Video signal is fed to a sync separator 1 and memory circuit 3. A control unit 2 operates to control a data electrode driver 4, scanning electrode driver 5, and memory circuit 3 in dependence on synchronizing signals separated by the sync separator 1. A liquid crystal display panel 8 has a plurality of scanning electrodes 6-1, 6-2 . . . 6-N and a plurality of data electrodes 7-1, 7-2 . . . 7-M. The number of scanning electrodes (N) is decided by the number of scanning lines in a field.

Referring to FIG. 2, a video signal 9 has 262 periods dependent on the number of scanning lines. A scanning electrode driving signal having a voltage which is obtained by 120 time-division multiplex drive method is sequentially applied to a selected scanning electrode during two horizontal scanning intervals of 2H (H is a period of one horizontal scanning interval). Accordingly, the selected scanning electrode (6-1) is applied with a scanning electrode drive signal during the scanning intervals (1) and (2), non-selected scanning electrodes (6-2) to (6-N) are applied with a scanning electrode non-drive signal. At the same time, data electrodes (7-1) to (7-M) are applied with data electrode drive signal or data electrode non-drive signal dependent on the selection in accordance with the video signal. During the next horizontal scanning intervals (3) and (4), the scanning electrode (6-2) is applied with a scanning electrode drive signal, and other electrodes are applied with a scanning electrode non-drive signal. At the same time, data electrodes (7-1) to (7-M) are applied with drive signal or non-drive signal. Similarly other scanning and data electrodes are sequentially applied with signals. During the intervals (239) and (240), the scanning electrode (6-N) is selected and one cycle completes in a field. At every vertical scanning interval, selection of the data electrodes is carried out in dependence on the video signal. Thus, picture is displayed on the display panel 8 in accordance with the video signal.

Referring to FIG. 3, a picture 10 on a CRT is displayed on the display panel 8 by the above described manner without expansion. Here, the expansion of the picture means that a part 11 of the picture 10 is expanded on the whole or a part of the display panel 8.

Explaining the expansion of the period between the intervals (120) and (239) of FIG. 2 (the expanded period is selected on demand), the picture data during the period are stored in the memory circuit 3 of FIG. 1. The stored picture data are displayed on the display panel 8 in accordance with the synchronizing signals in the same manner as the above described one.

In such a conventional system, since a memory is provided, the size of the display device is increased. Further, the device is expensive and decreases in responsibility.

SUMMARY OF THE INVENTION

The object of the present invention is to provide an expansion system for a liquid crystal video display device which is not provided with a memory for the expansion, thereby reducing the size of the display device, and has a high responsibility.

According to the object of the invention, there is provided an expansion system for a liquid crystal video display device of the type having a plurality of scanning electrodes, a plurality of data electrodes, drivers for respectively driving the scanning electrodes and data electrodes, a separator for separating a video signal into a horizontal sync signal and a vertical sync signal, a control unit for controlling the drivers in accordance with the sync signals. The system comprises first means for applying signals to the drivers during an expansion period in a field so as to apply drive voltages to the scanning electrodes and data electrodes, second means for causing the voltage between a scanning electrode and a data electrode to go to zero or about zero during the nonexpansion period in the field.

In an aspect of the present invention, the second means is means for stopping the first means from applying the signals to the drivers.

These and other objects and features of the present invention will become more apparent from the following description with reference to the accompanying drawings.

DESCRIPTION OF THE PREFERRED EMBODIMENTS

Figure 1:
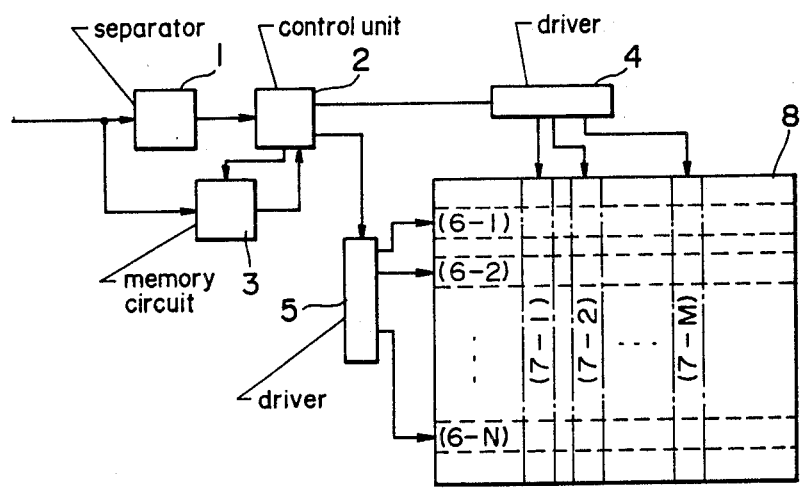
FIG. 1 is a block diagram showing a conventional system for a liquid crystal video display device.
Figure 2:
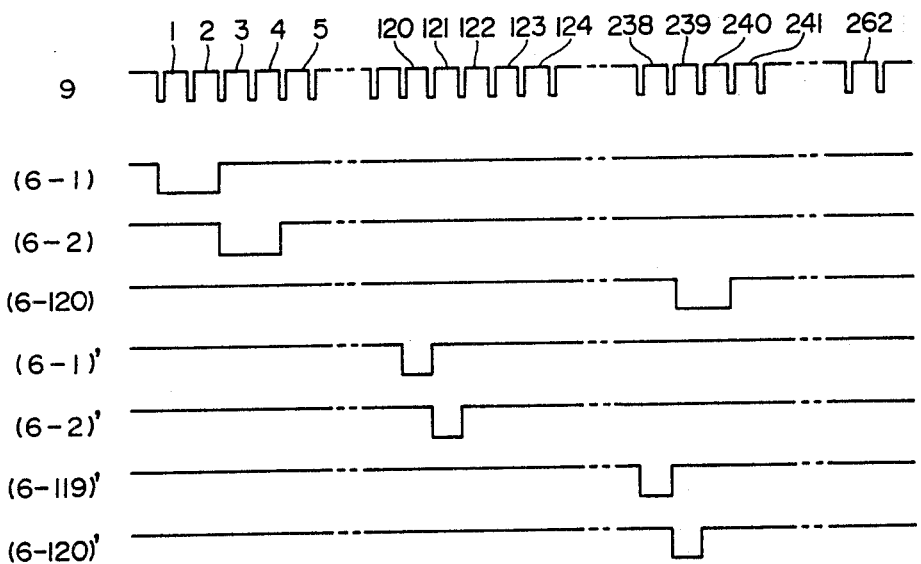
FIG. 2 is a timing chart showing driving timings for electrodes.
Figure 3:
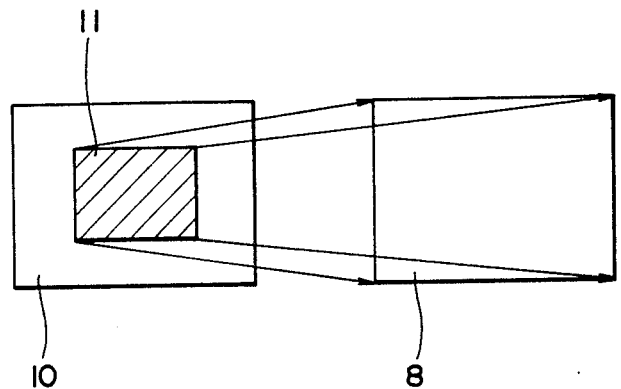
FIG. 3 is a perspective view showing an expansion display mode.
Figure 4:
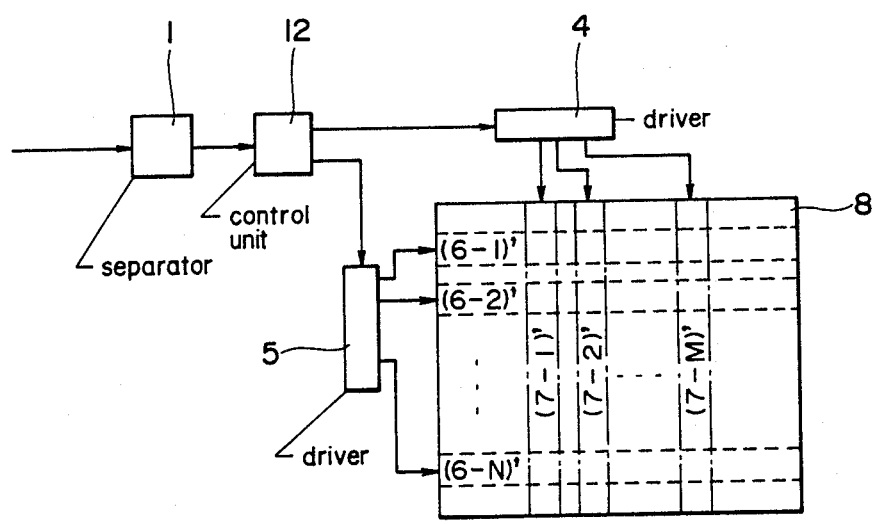
FIG. 4 is a block diagram showing a system according to the present invention.

Referring to FIG. 4, the system of the present invention is provided with a sync separator 1 and a control unit 12 for controlling the data electrode driver 4 and the scanning electrode driver 5. In accordance with the present invention, during a selected expansion period, for example the period between the interval (120) and the interval (239), scanning electrode drive signals are sequentially applied to all of scanning electrodes. Before and after the expansion period, all scanning electrodes are applied with non-drive signals. Explaining in detail, as shown in FIG. 2, the selected scanning electrode (6-1)' is applied with the drive signal during 1H period of the scanning interval (120). Other non-selected scanning electrodes (6-2)' to (6-120)' are applied with non-drive signals. At the same time, data electrodes (7-1)' to (7-M)' are applied with data electrode drive signal or data electrode non-drive signal in accordance with the video signal. In order to prevent the picture distortion, sampling frequency for the data electrode is twice as many as the ordinary state. During the period between scanning intervals (121) and (239), the same operation is taken place. During the non-expansion period between scanning intervals (1) and (119) and the period between scanning intervals (240) and (262), all scanning electrodes (6-1)′ to (6-120)′ and data electrodes (7-1)′ to (7-M)′ are applied with approximately equal voltages so that the voltage between the scanning electrode and the data electrode becomes about zero volt. Thus, image of the non-expansion period is not produced in the display panel 8.

Figure 5:
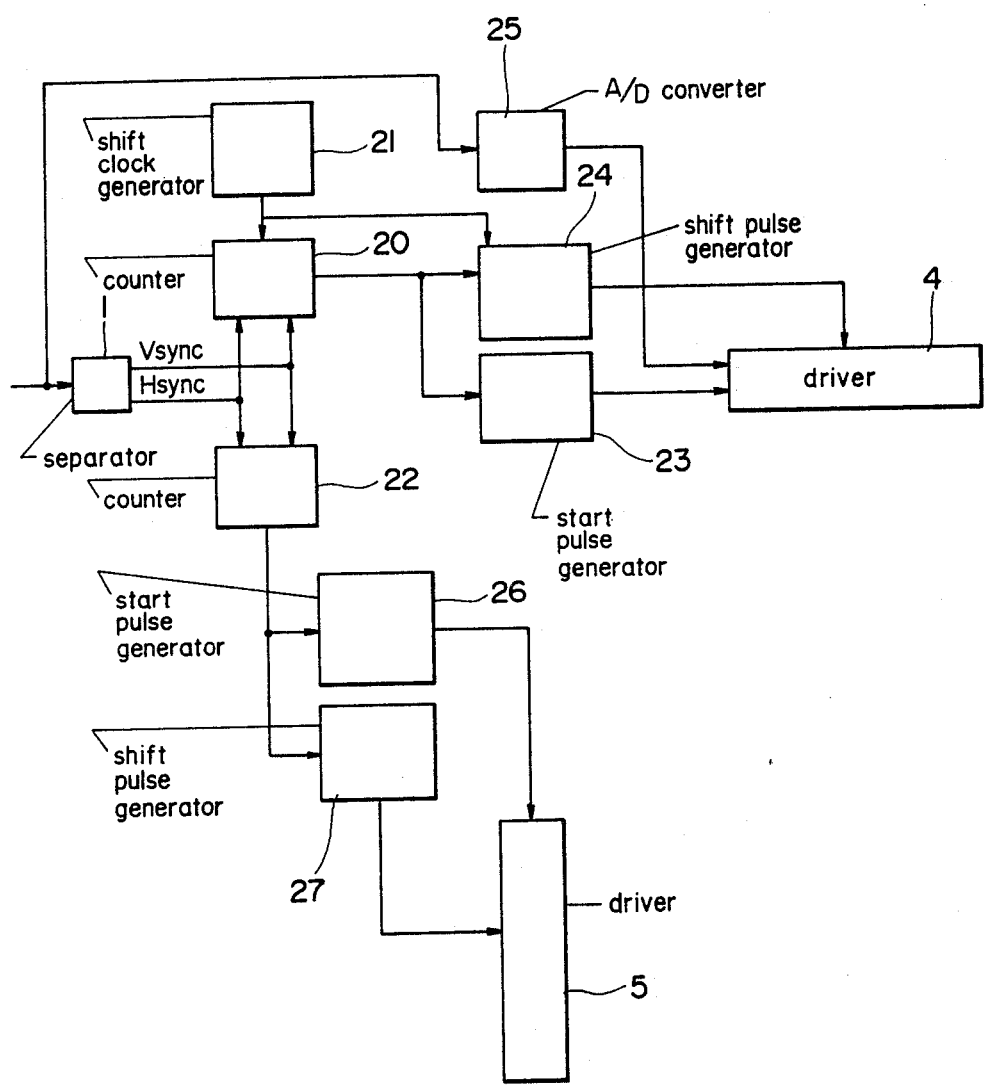
FIG. 5 is a block diagram showing a control unit in FIG. 4, in detail.

Explaining the composition and operation of the system with reference to FIG. 5, the control unit 12 comprises a shift clock counter 20, a data electrode shift clock generator 21, and a horizontal sync signal counter 22. The shift clock counter 20 and horizontal sync signal counter 22 are reset by a vertical sync signal separated by the sync separator 1. The shift clock counter 20 counts shift clocks generated from the data electrode shift clock generator 21. When the count of the counter 20 reaches a preset count, which means the beginning of the selected expansion period, the counter 20 produces an output signal which is applied to a data electrode drive start pulse generator 23 and to a data electrode shift pulse generator 24. The start pulse generated from the start pulse generator 23 is applied to the data electrode driver 4, so that a shift register in the data electrode driver 4 starts to operate in dependence on shift pulses supplied from the shift pulse generator 24. Video signal is converted to digital signals by a A/D converter 25, which are applied to the shift register and stored therein. Thus, data in the expansion period for one horizontal scanning are stored in the shift register and applied to data electrodes (7-1)′ to (7-M)′.

On the other hand, the horizontal sync signal counter 22 counts horizontal sync signals from the separator 1. When the count of the counter 22 reaches a set count corresponding to the beginning of the expanded period, the counter produces an output signal which is applied to a scaning electrode drive start pulse generator 26 and to a scanning electrode shift pulse generator 27. The start pulse from the start pulse generator 26 and shift pulse from the generator 27 operate a shift register in the scanning electrode driver, so that scanning electrodes (6-1)′ to (6-120)′ are sequentially driven.

The voltage between the data electrode drive signal and the scanning electrode drive signal is at a voltage higher than the threshold voltage of the liquid crystal display device. Thus, an image during a selected expansion period is produced in the liquid crystal display panel 8.

Since, in the expansion state, the period (H) of one horizontal scanning interval is a half of the period (2H) in the ordinary state, which means that the scanning speed in the expansion state is twice as high as the ordinary state, the image is expanded to double size.

During the non-selected or non-expansion period, since no signals are applied from the start pulse generators 23 and 26 to the drivers 4 and 5, no voltage is applied to the scanning electrodes and data electrodes or equal voltages are applied to both electrode serieses. Thus, the liquid crystal display panel does not produce an image of the non-expansion period.

Figure 6:
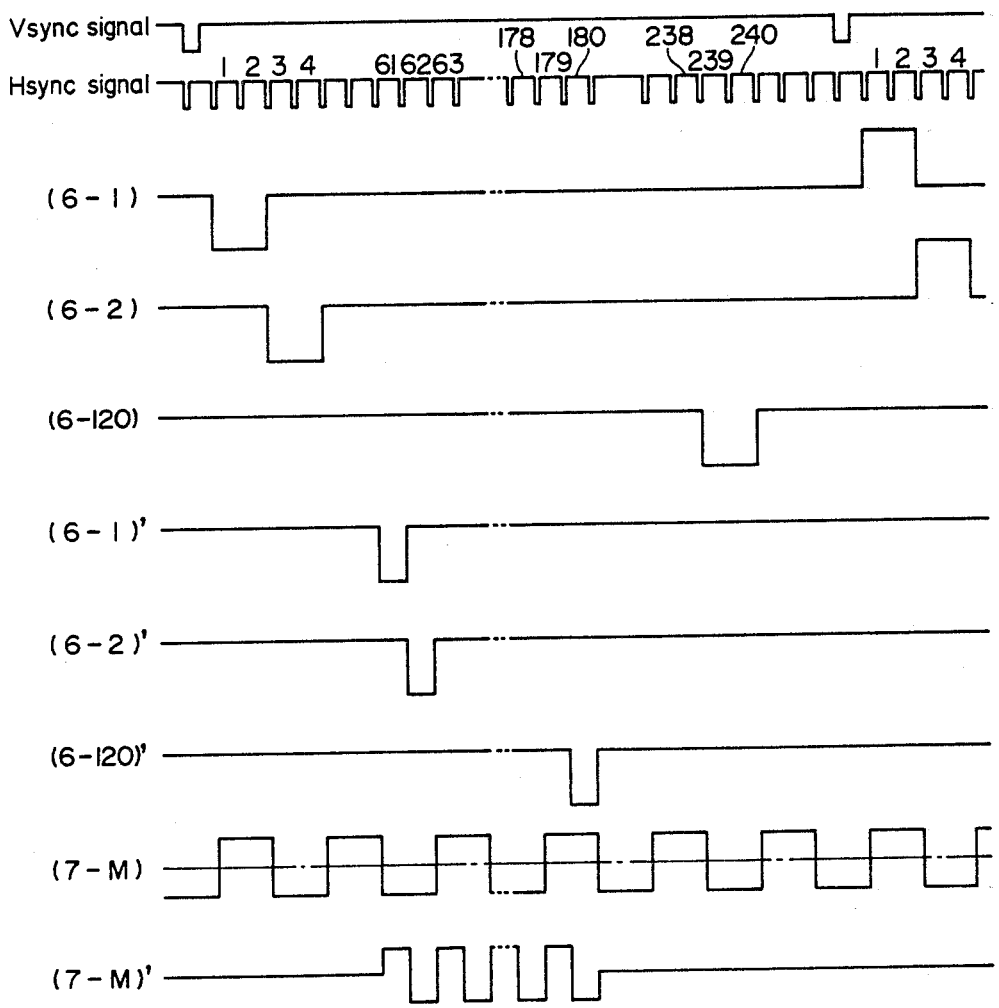
FIG. 6 shows waveforms of driving signals according to the present invention.

FIG. 6 shows waveforms in the system of FIG. 5 in which the period between the 61st horizontal sync signal and the 180th sync signal is selected to expand an image.

Figure 7:
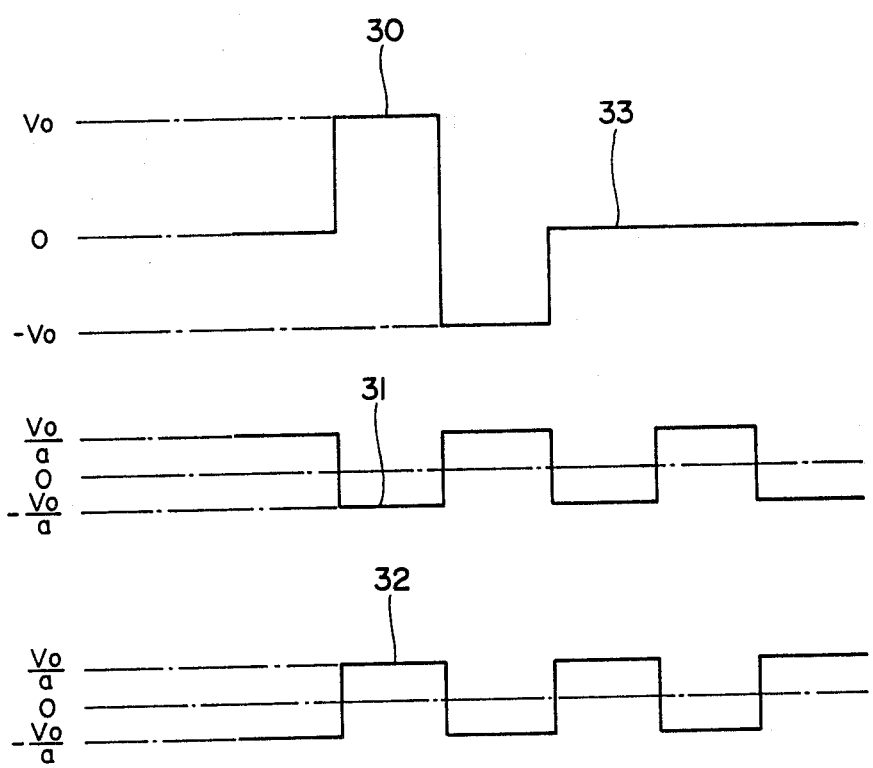
FIG. 7 shows waveforms for explaining levels of the waveforms.

FIG. 7 shows waveforms for explaining respective voltages. A waveform 30 represents voltage at a scanning electrode when selected, and waveform 33 shows voltage at a non-selected scanning electrode, a waveform 31 represents voltage at a data electrode when selected, and a waveform 32 shows voltage at a non-selected data electrode. Voltage between $V_0$ and $-(V_0/a)$ or $-V0$ and $V_0/a$ is applied to a selected electrode, and the RMS voltage of the selected electrode is higher than the threshold voltage of the liquid crystal, so that an image is produced at selected electrodes. On the contrary, voltage between $V_0$ and $V_0/a$ or $-V_0$ and $-(V_0/a)$ is applied to a non-selected electrode, and the RMS voltage of the non-selected electrode is lower than the threshold voltage. Accordingly, no image is produced at non-selected electrodes.

In FIG. 7, "a" is such a value as that the value of the following formula (1) becomes maximum.

$$\sqrt{1 + 4a/(a^2 - 2a + N)} \tag{1}$$

where N is the number of the scanning electrode.

"$V_0$" is such a value as to satisfy the following formula (2) at the threshold voltage $V_{th}$ of the liquid crystal display device.

$$V_{th} = V_0 \times \sqrt{\frac{1}{L}\{(N-1)/a^2 + (1 - 1/a)^2\}} \tag{2}$$

where L is the ratio of the period of time from the selection of a scanning electrode to the next selection of the scanning electrode to the period of time during which a scanning electrode is selected.

The system of the present invention is simplified and can be compacted, since no memory is provided. Further, the voltage between data and scanning electrodes during the non-expansion period is about zero, the crosstalk in the device does not increase, which ensures the contrast of the image at expansion.

While the invention has been described in conjunction with preferred specific embodiments thereof, it will be understood that this description is intended to illustrate and not limit the scope of the invention, which is defined by the following claims.

What is claimed is:

1. An improved expansion system for a liquid crystal video display device of the type having a plurality of scanning electrodes, a plurality of data electrodes, drivers for respectively driving the scanning electrodes and data electrodes, a separator for separating a video signal into a horizontal sync signal and a vertical sync signal, a control unit for controlling the drivers in accordance with the sync signals, wherein the improvement comprises:

means for applying signals to the drivers during an expansion period in a field so as to apply drive voltages to the scanning electrodes and data electrodes, and for applying approximately equal voltages to scanning electrodes and data electrodes causing the voltage between scanning electrodes and data electrodes to go to zero or about zero during the non-expansion period in the field.

2. An improved expansion system for a liquid crystal video display device of the type having a plurality of scanning electrodes, a plurality of data electrodes, drivers for respectively driving the scanning electrodes and data electrodes, a separator for separating a video signal into a horizontal sync signal and a vertical sync signal, a control unit for controlling the drivers in accordance with the sync signals, wherein the improvement comprises:

means included in said control unit for applying signals to the drivers during an expansion period in a field so as to apply drive voltages to the scanning electrodes and data electrodes, and for applying approximately equal voltages to scanning electrodes and data electrodes causing the voltage between scanning electrodes and data electrodes to go to zero or about zero during the non-expansion period in the field, said means comprising counters responsive to the horizontal and vertical sync signals for producing signals during the expansion period, start pulse generators responsive to the signals from the counters for starting the drivers operating to drive the scanning and data electrodes, and shift pulse generators responsive to the signal from the counters for shifting the operations of the drivers and for performing the horizontal scanning and vertical scanning.

* * * * *